Sept. 21, 1965  C. A. RIETZ ETAL  3,207,628
CONTINUOUS PROCESS FOR THE RECOVERY OF SUGAR FROM SUGAR CANE
Filed July 12, 1963  3 Sheets-Sheet 1

INVENTORS.
CARL A. RIETZ
JOHN H. PAYNE
BY
Flehr and Swain
Attorneys

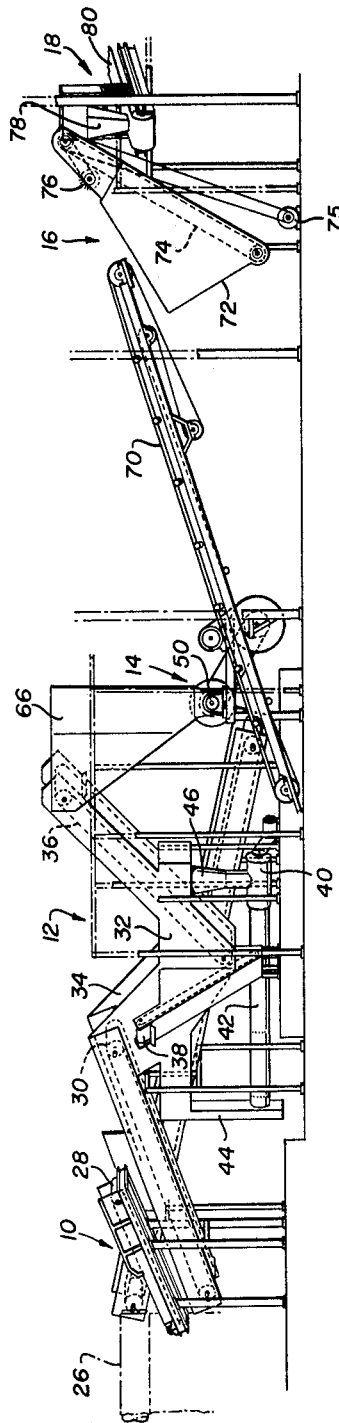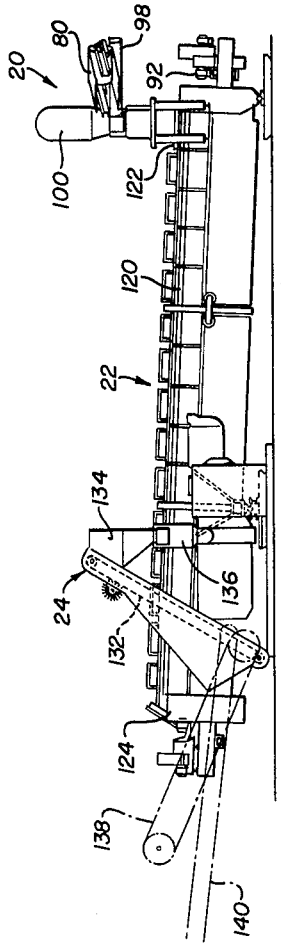

Sept. 21, 1965  C. A. RIETZ ETAL  3,207,628
CONTINUOUS PROCESS FOR THE RECOVERY OF SUGAR FROM SUGAR CANE
Filed July 12, 1963  3 Sheets-Sheet 3
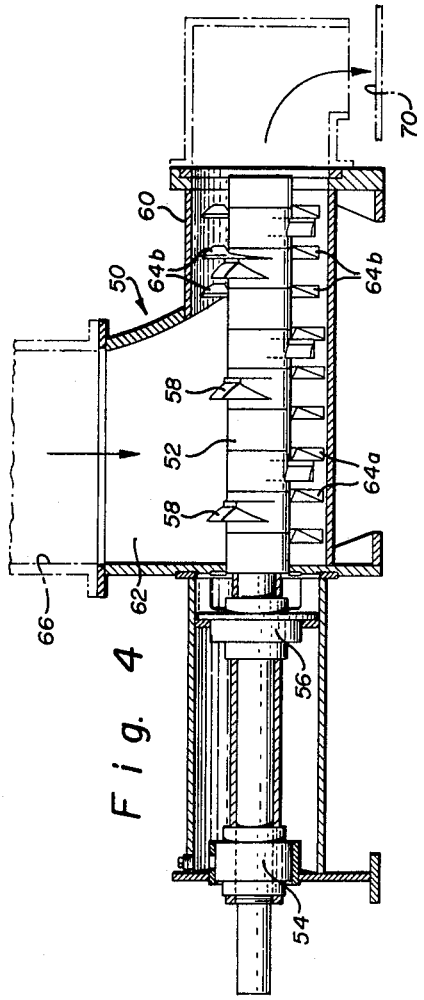
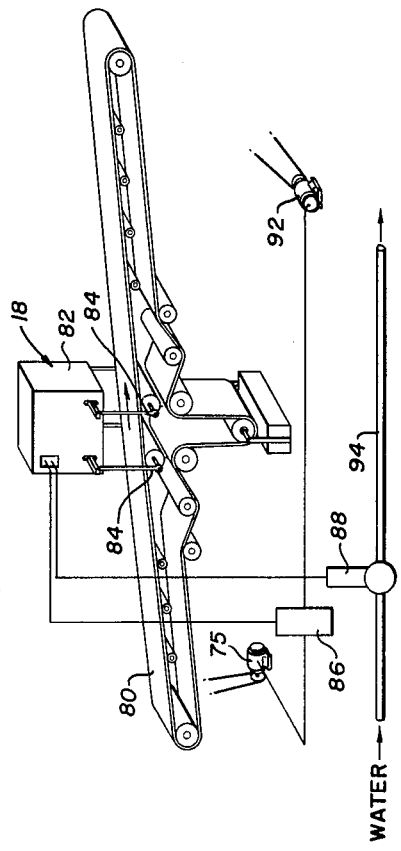
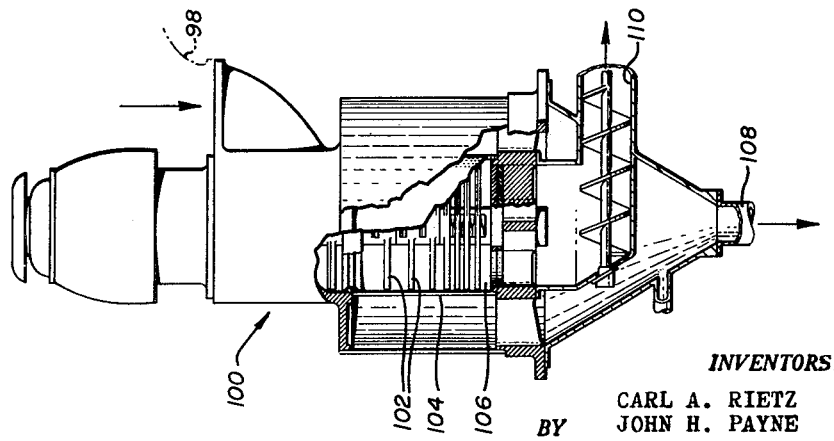
INVENTORS.
CARL A. RIETZ
JOHN H. PAYNE
BY
Flehr and Swain
Attorneys United States Patent Office 3,207,628
Patented Sept. 21, 1965

3,207,628
CONTINUOUS PROCESS FOR THE RECOVERY
OF SUGAR FROM SUGAR CANE
Carl A. Rietz, San Francisco, Calif., and John H. Payne,
Honolulu, Hawaii
Filed July 12, 1963, Ser. No. 294,549
1 Claim. (Cl. 127—43)

This application is a continuation-in-part of our copending application Serial No. 25,992 filed May 2, 1960, now abandoned.

This invention relates generally to processes and apparatus for the manufacture of sugar from sugar cane.

Despite early experimentation, there is today little variation in the processing of cane to obtain the raw cane sugar. Harvesting is done by hand or by mechanical devices and the freshly cut stalks moved directly to the factory, with a minimum of delay (to prevent loss of sucrose by conversion into glucose and fructose). At the factory, the cane is cleaned and reduced in size by rotating knives in preparation for removing the juice. The juice is extracted by passing the cane through a series of mills, each of which consists of three grooved rolls that exert a heavy pressure. As all the juice cannot be removed by means of pressure alone, water and weak juices may be added to aid in the extraction. Further processing of the juice results in a light brown raw sugar containing about 98% sucrose. The spent cane (bagasse) is either burned for fuel or used to manufacture various products such as insulating material.

In contrast to the processing employed with cane, the beet sugar industry has long successfully employed a more refined, continuous process, known as the diffusion process. This process takes advantage of the readily sliceable nature of the sugar beet to effect a highly efficient, continuous extraction of the sugar containing juices by dialysis (i.e., diffusion through a membrane). While providing a number of precedural advantages over batch processing, for example reduced pulp water loss, such processing is particularly advantageous in its avoidance of the high labor requirements associated with the batch process. Accordingly, some attempts have been made heretofore to slice cane stalks, much as beets are sliced into cossettes, and to subject them to the same type of continuous diffusion processing. To date none of these prior attempts have been entirely successful, principally because of difficulty in slicing the cane and also because the fibrous nature of the cane has heretofore resisted effective extraction by such diffusion technique.

In general, it is an object of the present invention to provide a satisfactory, workable process and apparatus for the continuous processing of sugar cane to extract its sugar content.

Another object of the invention is to provide a novel process and apparatus of this character wherein the freshly cut cane is first prepared by a special progressive mechanical disintegrating treatment before the sugar content is extracted.

Additional objects and advantages of the invention will appear from the following description in which a preferred embodiment has been set forth in detail in conjunction with the accompanying drawing.

Referring to the drawing:

FIGURE 2 is a view in elevation of a portion thereof, taken along the line 2—2 of FIGURE 1;

FIGURE 3 is a like view taken along the line 3—3 of FIGURE 1;

FIGURE 4 is a view in section and elevation of preferred means for carrying out the special disintegrating treatment;

FIGURE 5 is a side elevational view in section showing apparatus for the final disintegrating phase to produce a pulp-like material containing individualized fibers;

FIGURE 6 is a schematic view of weighing conveyor means employed in the system.

Figure 1:
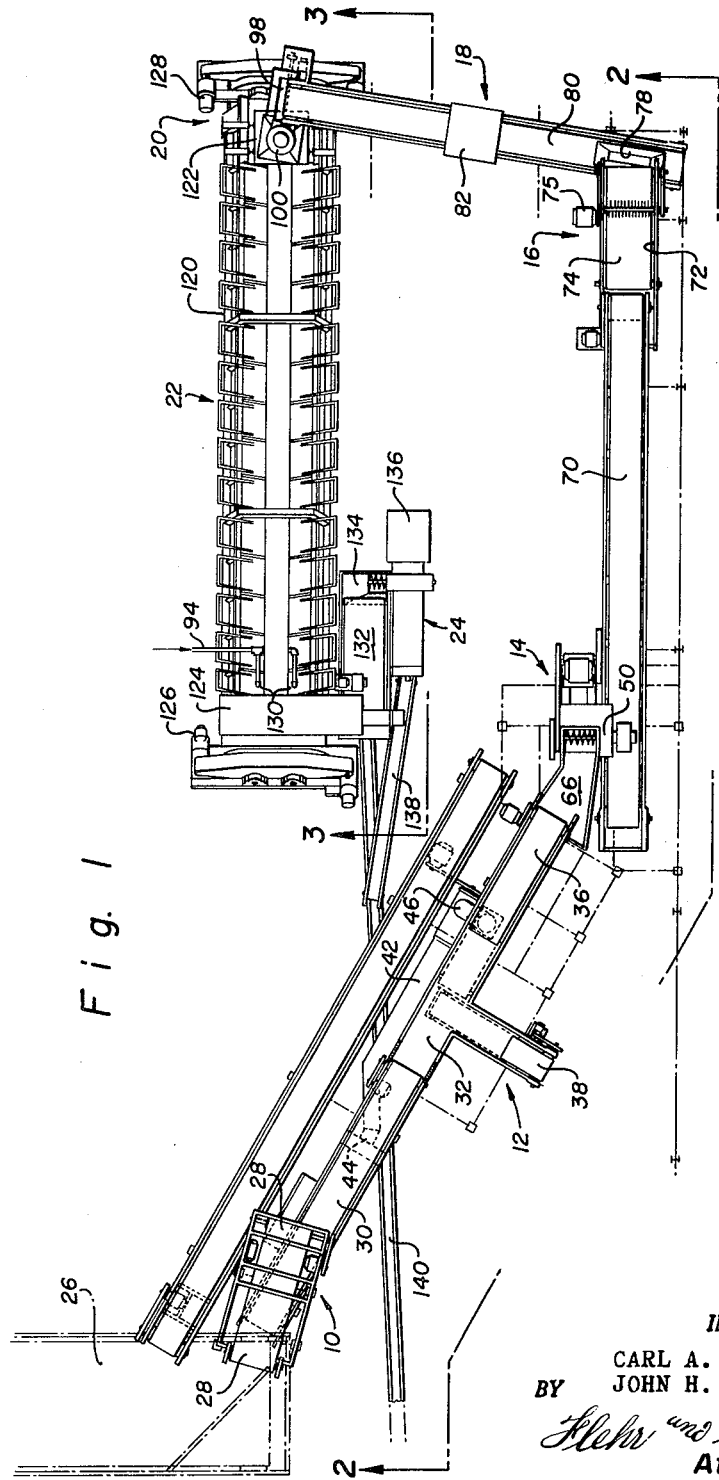
FIGURE 1 is a view in plan of apparatus capable of carrying out our process.

As previously noted, prior systems adapted to the recovery of juice from sugar cane make use of a milling operation in which the cane is subjected to pressure between the rolls of the mill. Apparatus for such processes, regardless of the particular system employed, is necessarily characterized by the use of massive milling components and machinery, coupled with high power and maintenance requirements. Such milling is also essentially batch processing with all the attendant difficulties. Moreover, with the advent of mechanical harvesting of the cane, large amounts of extraneous material (soil, rocks, etc.) find their way into the mills and seriously interfere with the efficiency of the process. Since mechanical harvesting is essential in many parts of the world, recovery of sucrose by such milling processes has gradually and continuously decreased in efficiency.

Milling of cane as described above expresses a substantial part of the juice. Some residual sugar in the crushed cane can be removed by diffusion, but the efficiency of such a diffusion operation is not as high as is desired, and the crushed cane is difficult to handle in ordinary diffusion equipment.

In general, the present invention makes possible a novel preparation of the cane for continuous sugar extraction, whereby better than 97% of the sucrose in cane is substantially completely recovered. The procedures of the invention can be carried out in conjunction with customary cane harvesting operations by which a supply of cane stalks is more or less continuously delivered to the factory. The apparatus performs the function of conveying freshly cut cane into the system, separating rocks, gravel and similar heavy impurities, simultaneously with the washing of the cane, subjecting the clean cane to progressive chopping, breaking and masticating to reduce virtually all the fibrous cane to relatively short fragments, with cane nodes in minor proportion and size, and thereafter subjecting the resulting cane fragments and nodes to a progressive impacting action. Processing in this manner reduces the cane to a mass of substantially individualized fibers with all bundles of fibers and nodes being disintegrated.

The disintegrated pulp-like mass is then subjected to continuous extraction processing, which preferably takes place in countercurrent fashion against a controlled flow of an extraction liquid. We have found such processing to effect a substantially complete removal of the sugar content from the cane. Preferably, the residual bagasse can be de-watered to recover the individualized fibers for use in the manufacture of high quality paper or related products. The press water from this processing, containing a certain amount of sugar, is preferably returned to the extracting equipment to effect improved extraction efficiencies (generally of the order of 98% or better).

Our preferred apparatus, illustrated in the drawing, comprises a number of separate operating stations including a feed conveying and receiving station 10, a rock and heavy trash separation station 12, a prebreaking station 14, a feed accumulating station 16, a weighting conveyer station 18, a disintegrating station 20, a continuous diffusion station 22, and a de-watering or fiber recovery station 24. As will be apparent from the following description the operations of these various stations tend to supplement one another and to cooperate in providing an efficient cane diffusion process, as well as desired characteristics of the residual bagasse to make possible its commercial utilization.

Feed conveying and receiving station

Freshly cut, pre-washed cane is delivered to the system by any suitable conveying means 26 from whence it is deflected to a retractable receiving conveyer 28. The cane on the conveyer 28 is discharged upon an elevating conveyer 30 for conveyance to the first treating station 12. The conveyers 28 and 30 are preferably of the endless, slat conveyer type to facilitate the handling of the cane in various lengths, ranging from eight to fifteen feet in length or longer.

Rock separation station

The station 12 comprises a tank 32 filled with water and designed to separate the cane by flotation. The lengths of cane discharged by the conveyor 30 slide down the chute 34 onto the surface of the water, causing heavy contaminants, such as rocks, gravel, soil, etc. to settle to the bottom of the tank. The floating cane is picked up by an elevating slat conveyer 36 for discharge to the pre-breaker station. The heavy trash is collected at the bottom of the tank on the upwardly inclined separating conveyor 38 for delivery to a bin, or directly to dirt trucks passing beneath the conveyer.

In the illustrated apparatus, a fluid flow system is employed to aid in the separation of the cane. Essentially this system comprises a pump 40 having its discharge connected to the conduit 42 and riser 44, and its intake to the suction conduit 46. The outflow from the pump circulates across the surface of the tank 32 in the direction of conveyance and returns to the pump through the suction conduit. The cane is thus positively floated from the chute 34 to the elevating conveyor 36.

The prebreaking station

The prebreaker apparatus at station 14 functions to chop and break the lengths of cane into relatively short cane fragments, and to mull and masticate or "chew" these fragments, and the nodes of the cane, with a minimum of abrasion, to produce a macerated, chopped, crushed mass. Cane preparation in this manner provides a high density mass of broken, crushed cane adapted to maintain a desired compactness and homogeneity suitable for subsequent disintegration at station 20 and diffusion at station 22.

The prebreaker 50 at the station 14 can be of the type disclosed in Rietz Patent No. 2,971,551. Suitable details of such a device are illustrated in FIGURE 4. The elongated horizontal rotor 52 can be supported externally by the bearings 54 and 56. The free end of the shaft is provided with a plurality of vane-like breaker arms 58 extending into the cylindrical housing 60, and inclined with respect to the axis of the shaft so as to urge the cane being chopped and broken toward the discharge end of the housing. The housing 60, and the lower portion of the hopper 62, is provided with spaced breaker anvils 64 extending between the paths of movement of the breaker arms 58. By way of illustration, such a prebreaker with a 12- to 15-inch rotor, and powered by a 75 to 100 H.P. motor operating at approximately 300 r.p.m. will handle 20 tons of cane per hour without any difficulty.

As illustrated, the prebreaker station includes an inclined feed chute 66 of substantial vertical dimension associated with the hopper 62 of the prebreaker. This construction renders the prebreaker substantially self-feeding in that the lengths of cane tend to enter the hopper 62 in endwise fashion, where they are initially chopped and broken into relatively short pieces by the action of the inlet breaker arms 58 against the anvils 64a. The cane is quickly shredded and broken up and forced downwardly into shearing contact with the anvils 64b of the cylindrical breaker section 60. The crushing and shearing action in the latter section tends to reduce the length of the cane to produce fragments of suitable size for subsequent disintegration to produce individualized fiber. By way of example, the cane can be reduced to fragments less than about two inches in length, and less than about one-quarter inch in cross section, with a large proportion being additionally reduced to unite less than one inch in length. The prebreaker also serves to reduce the nodes or joints of the cane so that the great majority are less than about one-quarter of an inch in dimension, the proportion of unbroken nodes being probably less than about 10% of the total.

The outflow from the prebreaker is discharged (with suitable deflection) directly on an endless belt conveyor 70 for elevation to the accumulator station 16.

Accumulating station

The accumulating station 16 is essentially a storage hopper capable of holding a sufficient supply of chopped, macerated cane to insure uniform feed to subsequent operations. Efficient extraction requires that the extracting equipment be completely filled with cane material at all times, to avoid the creation of voids or channels such as normally give rise to excessive pulp water loss and reduced capacity.

The accumulator illustrated in the drawings comprises a hopper 72 associated with an elevating slat conveyor 74. The hopper should be of sufficient capacity to hold a five to ten minute supply of cane material, to insure a reasonable uniform feed to the diffuser despite variable delivery from the feed conveyor 26. The conveyor 74 operates at a rate determined by the variable speed drive 75 to withdraw desired amounts of the cane material for delivery to the weighing station, as will appear. A rotary brush or scraper 76 is preferably employed with the conveyor to insure a uniform discharge of the prepared cane material to the hopper 78 associated with the receiving end of the weighing conveyor 80.

Weighing conveying station

Weighing conveyors and controllers, such as the weighing conveyor 80 and controller 82, are commonly used by the industry in conjunction with continuous diffusion equipment. In the present instance, the device functions to automatically weigh a continuous stream of the chopped, macerated cane conveyed through it, and at the same time to actuate controllers of variables such as the rate of supply of cane to the extractor, the rate of travel of cane pulp through the extractor, and the extractor supply water flow.

Suitable details for the weighing conveyor device 18 are illustrated schematically in FIGURE 6. Thus the conveyor 80 functions to receive cane from the accumulating station and to elevate it for discharge into the disintegrating station 20. The weight of cane passing over the indicators 84 functions to actuate the controllers 86 and 88 through the main controller unit 82. The controller 86 regulates the variable drive 75 for the elevating conveyor 74 at the accumulating station. It also functions to control the motor 92 at the extractor station to determine the rate of travel of the disintegrated cane through the extractor tank 120. The controller 88 in turn regulates the flow of water for extraction purposes through the water supply line 94. Any suitable control mechanism, of known design, can be employed to provide the various control function (e.g. the Merrick weightometer, manufactured by the Merrick Scale Manufacturing Co.).

Disintegrating station

The disintegrating station includes an inlet hopper 98 and the disintegrator 100. The disintegrator continuously receives predetermined amounts of cane material from the weighing conveyor and serve to reduce the cane fragments to individualized fibers and pulp. It serves to break up and disintegrate the bundles of fibers, shives and nodes.

The disintegrator 100 can be of the type disclosed in Rietz Patent No. 2,325,426. Briefly, such a machine consists of a vertical rotor provided with impact disintegrating hammers 102 and surrounded by a cylindrical screen 104. The hammers are shown spaced at progressively shorter intervals from the top to the bottom of the rotor. During operation, the cane in chopped macerated form is delivered to the hopper 98 and falls into the space above the rotor for downward progression into the zone of operation of the rotating hammers 102. The disintegrated cane material, after passing through the screen 104, drops downwardly through the lower discharge opening 108. Discharge of material from the space below the lower hammers can be controlled by means of a secondary discharge so that a mass of disintegrated material can be caused to accumulate in such space. The lowermost hammers 102 have their faces beveled so as to maintain the disintegrated material in the space 106 under pressure, with the result that the material in this space is subjected to a virtual beating action, adapted to force properly sized material outwardly through the openings of the screen 104.

In the system illustrated, the discharge opening 108 of the disintegrator discharges directly into the housing of the extraction equipment 100 at station 22. The secondary discharge means 110 illustrated corresponds to the seconday discharge apparatus 23 shown in FIGURES 1 and 2 of Patent No. 2,325,426. Such a secondary discharge can be in the form of a feed screw, whereby material not passing through the screen can be removed from the system. It will be understood that material discharged through the secondary outlet 110 is substantially dehydrated due to the pressure applied in the zone 106. The secondary discharge can be operated at a very low discharge rate. Frequently its use is not required and in such event such means can be omitted.

In a typical operation employing a 75 H.P. Rietz disintegrator, fitted with 18- to 24-inch swing hammers working against a very coarse screen (e.g. 2½ by 4 inches), a machine of this character will satisfactorily disintegrate the chopped cane to a sugar-rich, readily diffusible state at a rate approaching 20 tons per hour. The resulting disintegrated pulp-like material comprises a dense mass of substantially individualized fibers, all of which are less than two inches in length and in which the nodes are crushed and all bundles or shives opened or reduced to ¼ inch or less in dimension. Cane material in this form facilitates subsequent efficient circulation, sieving, back washing in the extractor. Such cane material also is important to obtain the desired sugar yield efficiency.

*Continuous extractor station*

At the station 22, the cane is continuously received and conveyed gradually upward against a countercurrent gravity flow of extraction liquid, to achieve a virtually complete extraction of the sugar content of the pulp-like material. The extractor also delivers as a by-product, fibers in a form adapted to direct use in paper making and similar processing, with only preliminary de-watering and screening to remove pith.

The illustrated extractor 120 can be a diffuser of the type generally disclosed in U.S. Patents 2,713,009 and 2,885,311. When applied to material like sugar beet, cossettes, such equipment is referred to as a diffuser. Apparatus of this type comprises a steam jacketed inclined tank or cell 120, mounted at a slight inclination to the horizontal. Movement of the cane pulp within the tank from an inlet 122 at the lower end to a discharge outlet 124 at the upper end, is provided by a dual conveying unit having an upper drive 126 and a lower drive 128. These drives serve to operate a pair of cooperating helical conveyers consisting of spaced apart shafts supporting a series of co-acting helical flights, for example as in FIGURES 5 and 6 of Patent No. 2,885,311. The flights of these helical conveyers are disposed in intermeshing relationship rotating in opposite directions as indicated in said FIGURES 5 and 6, and function to provide a continuous generally rotary movement of the cane pulp at constant linear speed upwardly through the extractor tank. Simultaneously hot water is fed through upper inlets 130 to maintain a desired fill of pulp water within the tank, and to provide a countercurrent gravity flow extraction system. The illustrated apparatus generally provides uniform concentrations at points along the length of the tank 120, to provide a highly efficient diffusion. It should be understood however that other types of apparatus can be satisfactorily used, for example apparatus as illustrated in U.S. Patents 2,390,131, 2,468,720, and 2,658,010.

A satisfactory extraction apparatus employed in our system makes use of the general system of Patent 2,885,311, with replacement of the broken flight helical scrolls by continuous flight scrolls, and a 45° angle fiber discharge roll associated with the discharge outlet 124. Such unit is approximately 60 feet long and contains two parallel perforated scrolls, 52 inches in diameter, which propel the distinegrated cane countercurrent to the gravity flow of pulp water for a length of approximately 40 feet. Pulp water temperatures range from 70° to 85° C. The gravitational slope of the diffuser can also vary from about 2° to 8°, depending upon specific operating conditions. Successful operation of this equipment is generally achieved in a condition of dynamic equilibruim, at which the rate of flow of pulp water by gravity is controlled by the slope of the tank 120, the rate of rotation of the helical scrolls, the quantity of cane pulp fed to the system, and the permeability of the cane material, so that the level of liquid is approximately the same throughout the diffuser. Experience has shown that with extractor apparatus of this kind we can satisfactorily process from 15 to 20 tons of can per hour, with a sugar yield of 98% or higher.

*Fiber recovery station*

It is desirable that the fibrous residue (bagasse) discharged from the extractor be pressed or otherwise dewatered, and that the press juice be returned to the extractor for extraction of its sugar content. The dewatered bagasse, essentially in the form of individualized fibers, can be subjected to further processing (e.g. screening to remove pith) as necessary to permit use of the fibers directly in paper making or related fields.

In the illustrated apparatus, the bagasse discharged from the extractor is conveyed upwardly by the elevating conveyer 132 and fed at a relatively uniform rate to the hopper 134 for the de-watering press 136. Any suitable continuous pressing apparatus can be employed, such as the so-called "French" press disclosed in United States Patent No. 1,421,282 or 1,733,381. Briefly, apparatus of this type comprises a perforated cylindrical casing in which a feed screw propels the bagasse into a zone of operation of an extractor or pressure screw, which squeezes the fibrous material to substantial dryness. The extractor screw is generally conical in configuration and operates partly within and partly without the cylindrical casing to provide an annular outlet for the pressed material (as shown in the longitudinal sectional views of the above-mentioned patents). A moisture content between about 45 to 50% is generally preferred for this material. The press water which contains a certain amount of sugar, is returned to the extractor processing and in effect becomes a part of the pulp wash water. The substantially dry bagasse is discharged from the station 24 by any suitable conveyer means, such as the endless belt conveyers 138 and 140.

*Operation*

Reviewing briefly the operation of the system, washed cane of various lengths up to twenty feet is received at the station 10 for conveyance to the rock separation station 12 where the cane is again washed, and separated by flotation. The floating cane is picked up by the elevating conveyer 36 and discharged endwise into the chute 66 associated with the prebreaker 50 at station 14. The prebreaker is essentially a self-feeding prebreaker and functions to reduce the length of the cane to short chopped pieces and to crush and macerate the same to produce a crushed, macerated mass of cane fragments containing a relatively small percent of cane nodes and bundles. The outflow from the prebreaker is in the form of a relatively compact dense pulp-like mass generally weighing more than 20 and close to 30 pounds per cubic foot. This material is conveyed by the elevating conveyer 70 to the accumulating station 16. The hopper 72 of this station provides a reservoir to insure a uniform feed to the subsequent sugar extraction processing. The material is then discharged from the conveyer 74 onto the weighing conveyer 80, in response to the weight of the material as sensed by the controller 82, and is delivered to the disintegrator 100 at station 20. In general, preferred densities of the feed to the disintegrator are in the range from 15 to 30 pounds per cubic foot (optimum about 25 to 30 pounds per cubic foot). The disintegrator serves to further reduce the cane, by virtue of rapid progressive impacting action, to produce a pulp-like mass containing substantially individualized fibers virtually free of cane nodes and bundles. This pulp is discharged directly to the inlet 122 of the extractor 120 at station 22, and is conveyed in continuous fashion through the extractor by means of the helical scrolls. The cane material moves gradually upward in rotary fashion against countercurrent gravity flow of the extraction liquid, which effects substantially complete extraction of the sugar content. In general, the extracted juice may be further processed in conventional manner (e.g. screening, clarifying with lime and phosphoric acid, filtering, evaporating, crystallizing and centrifuging to produce a high grade raw sugar for shipment to the refinery). The bagasse discharge from the extractor station 22 can be de-watered as by pressing at the fiber recovery station 24. This fiber in a substantially individualized, unabraded condition, is of very high quality and has a separate commercial value not heretofore possessed by conventional bagasse materials.

As previously indicated, a feature of our process is the reduction of macerated short cane lengths to a pulp-like mass from which sugar can be readily and quickly removed. While we employ equipment of the diffusion type for extraction, the removal of sugar from cellulose fiber is not deemed comparable to sugar removed from sugar beet cossettes, where conventional diffusion equipment is commonly employed. According to our observations, treatment of the cane in our process, including progressive impact disintegration in the disintegrator 100, serves to mechanically rupture substantially all (e.g. 95%) of the sugar containing cells of the cane. Therefore, when such a pulp is fed to diffusion equipment for extraction, most of the juice is removed in the extracting liquid by washing rather than by osmosis through the cell walls. Such rupture of the cell walls is attributed to the progressive impact action of the disintegrator 100 when such disintegration is carried out to the extent described, namely, to provide a cane material comprising individualized fiber, as distinguished from fiber bundles.

It will be evident that our invention has a number of desirable features. Particularly it provides relatively high recovery yields compared to prior processes. Labor is reduced to a minimum by continuous operation. The process is economical with respect to fresh water requirements, and the extractor can be operated to produce a more concentrated sugar liquor for further processing. The by-product fiber has a minimum sugar content is well adapted for the manufacture of paper and other products.

We claim:

In a continuous process for the recovery of sugar from sugar cane, the steps of continuously feeding a body of sugar cane into a first longitudinally extending zone; progressively moving said cane longitudinally through said zone and during the period of residence therein, breaking said cane into relatively short fragments which are mulled by repeated blows by rotary members acting against a fixed surface substantially throughout said longitudinally extending zone to reduce said fragments and the major proportion of the nodes contained therein; continuously feeding the resulting mass into a second longitudinally extending zone; progressively moving said mass through said second zone and during the period of residence therein, subjecting said mass to repeated blows by rotary members working against a fixed surface substantially throughout said second longitudinally extending zone to rupture the major proportion of the sugar-containing cells and produce a compact mass of individualized fibers; continuously feeding said compact mass into a third zone; and contacting said mass while in said third zone with an extracting liquor to remove the sugar.

References Cited by the Examiner

UNITED STATES PATENTS

| | | | |
|---|---|---|---|
| 313,510 | 3/85 | Meyer. | |
| 402,082 | 4/89 | Hughes | 127—42 |
| 443,522 | 12/90 | Hughes. | |
| 443,523 | 12/90 | Hughes. | |
| 1,307,761 | 6/19 | Shelton | 241—86 |
| 1,369,180 | 2/21 | Lindenberg | 127—43 |
| 1,688,905 | 10/28 | Vazquez | 127—4 |
| 2,325,426 | 7/43 | Rietz | 241—86 |

FOREIGN PATENTS

| | | |
|---|---|---|
| 25,251 | 1911 | Great Britain. |
| 19,161 | 1912 | Great Britain. |
| 5,145 | 1913 | Great Britain. |

MORRIS O. WOLK, *Primary Examiner.*